United States Patent Office 3,684,712
Patented Aug. 15, 1972

3,684,712
CARBON DIOXIDE ABSORBING CHEMICAL
Robert M. Bovard, De Soto, Kans., assignor to
A-T-O Inc., Cleveland, Ohio
No Drawing. Filed Feb. 2, 1970, Ser. No. 8,093
The portion of the term of the patent subsequent to
Jan. 13, 1987, has been disclaimed
Int. Cl. B01j *11/32*
U.S. Cl. 252—45 F
7 Claims

ABSTRACT OF THE DISCLOSURE

A carbon dioxide absorption composition having controlled water solubility characteristics and caustic hazard suitable for utilization in marine and submarine environments is provided comprising a body having a core of lithium hydroxide monohydrate and an outlet layer of magnesium oxide, or other alkaline earth oxide, or lithium hydroxide monohydrate modified alkaline earth oxide. The magnesium oxide permits permeation by carbon dioxide, but excludes water from the core. In addition, the magnesium oxide is activated by lithium hydroxide and thus serves itself to effectively absorb carbon dioxide.

SUMMARY OF DISCLOSURE

This invention relates to carbon dioxide absorption compositions and more particularly to such compositions which have minimal water solubility with high absorption characteristics. Specifically this invention relates to carbon dioxide absorbing bodies comprising a core of lithium hydroxide and an outer layer of magnesium oxide.

DISCLOSURE

The use of alkali and alkaline earth metals for carbon dioxide absorption in air purification has been known for many years. Most favored has been a composition named "Baralyme" which has had a varying composition over the years. Originally "Baralyme" was composed of 80% calcium hydroxide and 20% barium hydroxide octahydrate with a trace of wetting agent. More recently this composition has been modified to incorporate the potassium hydroxide therein. Alternative compositions include other alkali metal hydroxides such as sodium or lithium hydroxide, etc.

The compositions are generally quite satisfactory for normal air purification systems for the removal of carbon dioxide. However, in marine and undersea environments where there is a possibility of water flooding of the composition canister, a problem is created which renders the above noted standards unsuitable. This is caused by the solubility characteristics of the Baralyme components or the alkali metal hydroxides. Briefly, these components are in varying degree quite water soluble and produce caustic solutions easily. The hazard of caustic injury from these components thus becomes apparent in an undersea environment where leakage of the water into the canister of an absorption agent would immediately produce a strong caustic solution.

In view of the known reactions of oxides and hydroxides with carbon dioxide it is apparent that the most desirable reactants would be the oxides since in the reaction with carbon dioxide only a carbonate is formed. However, neither the hydroxide or oxide will react with dry carbon dioxide so there must be some water present. Of course this required presence could result in the above noted causticizing if it were not strictly controlled. One additional dictate of a satisfactory absorption system is maximum reactivity. From this it is desirable to utilize an alkali earth metal rather than an alkali metal in that the former acts on a one-to-one molar ratio while the latter requires two moles for each mole of carbon dioxide present in order to produce the carbonates.

In considering all possible alkali and alkaline earth metals for use in absorbers it appears from both solubility, state, and valence that magnesium oxide would be most desirable for use in carbon dioxide reactions. This material is extremely preferable in undersea applications because of its minimal solubility in the hydroxide form, its bivalency and of course its oxide nature. However, it suffers from the disadvantage of being very weak in its reaction with carbon dioxide and in itself a poor absorber thereof.

Therefore it is an object of the instant invention to provide a carbon dioxide absorption composition which eliminates the caustic hazard of undersea use while maintaining high activity for absorption.

It is a further object of the instant invention to provide an absorbing composition which is predominantly formed of a bivalent oxide for maximum reactivity with carbon dioxide with minimal water formation.

It is still a further object of the instant invention to provide an absorption composition comprising predominantly magnesium oxide so modified as to be highly reactive to carbon dioxide.

It is another object of the instant invention to activate magnesium oxide for carbon dioxide absorption whereby the water necessary for initiating and maintaining the reaction is provided by the activiator.

These and other objects will become apparent from the following description and claims.

Magnesium oxide can be formed into highly reactive material with carbon dioxide by incorporation of lithium hydroxide therein, compacting under high pressure, granulating and drying. The basic composition of the instant invention contains only two components, i.e. magnesium oxide and lithium hydroxide monohydrate (LiO—$H_2O$) there being no need for additional wetting agents, etc. as in "Baralyme." Such a composition is provided in the aforementioned application Ser. No. 627,684, now U.S. Pat. 3,489,693, where the composition may contain from about 60 to 95% magnesium oxide with 40 to 5% lithium hydroxide monohydrate although it is preferred for a maximum effective range that the composition contain 85 to 90% magnesium hydroxide to 10 to 15% lithium hydroxide monohydrate. Optimum results have been obtained with an 88–12 blend (all proportions are percent by weight).

It has been found that for a given weight or volume of absorptive material, a more effective and capacious absorbent is provided with further lessened caustic hazard by forming an absorptive body comprising a core of lithium hydroxide monohydrate and an outer layer of alkaline earth oxide, preferably magnesium oxide, more preferably where the magnesium oxide of the outer layer is combined with an absorption promoting proportion of lithium hydroxide monohydrate.

Many techniques are known and commercially practiced for forming such bodies, e.g. the techniques utilized in the pharmaceutical industry for forming coated tablets and the like. Such well-known processes are readily adapted to the preparation of the absorbent bodies of the present invention. A core of lithium hydroxide is formed into granules, for example, as taught by U.S. Pat. 2,629,-652, issued Feb. 24, 1953, to Schechter et al., where the core component, lithium hydroxide, is compressed at pressures of about 15,000 to 30,000 pounds per square inch to form a cake, which is granulated in a conventional granulator to the desired size and dried to remove water of hydration. Other techniques can also be utilized for the formation of the core as well, including tableting or briquetting techniques using conventional apparatus, which can provide a wide variety of shapes and sizes.

Irrespective of the particular technique utilized, the formed lithium hydroxide core is then coated with an outer layer of alkaline earth oxide, preferably magnesium oxide. The formation of the outer layer is conveniently formed by rolling the core in a dry bed of finely divided magnesium oxide followed by drying at a controlled rate, e.g. vacuum drying. Other techniques known to the art can be used as well. The present technique is preferred, however, for its ease and convenience and the minimal equipment requirements. The magnesium oxide can be used alone, although in some circumstances it is preferred to combine it will a suitable proportion (e.g. up to 40 weight percent) of additional lithium hydroxide, such as, for example, when the absorbent body is to be utilized in an environment wherein some causticity can be tolerated. It is also preferred to include a minor amount, e.g. up to about 10 weight percent, of sodium silicate in the outer layer, which results in a denser, harder surface which is less susceptible to abrasion without impairment of the absorptive character of the body.

As pointed out above the magnesium oxide is not highly carbon dioxide reactive in its natural state. With the addition of the minor proportions of lithium hydroxide monohydrate and subsequent heating, the magnesium oxide becomes highly reactive. It is not completely understood how the lithium hydroxide acts to accelerate the reaction, but it is believed that the lithium hydroxide catalyzes or accelerates the magnesium oxide-carbon dioxide reation.

The absorbent bodies of the present invention can be formed in any convenient size and shape, although it is preferred that the bodies be of generally spherical shape and a relatively small size, on the order of, for example, about 0.1 to 1 inch in diameter. Shapes other than spherical are not generally preferred because of difficulties in handling and packing, and because other shapes do not have the structural integrity of spherical shapes. Bodies having a diameter of greater than about 1 inch are not preferred because of the resulting frangibility and because too much space is consumed. On the other hand, particles smaller than about 0.1 inch in diameter pack too densely and impede the flow of gases through the absorbing system. There are, of course, situations wherein the foregoing criteria are not significant, and sizes and/or shapes of absorbing bodies will be appropriate other than the foregoing preferred dimensions, and the present invention is accordingly not limited thereto.

For a given size and shape, the absorbent body will be formed so that the core portion preferably constitutes about 75 to 95 percent of the diameter, and the outer layer, correspondingly, will be about 25 to 10 percent. Generally, the outer layer will be a lesser proportion of larger bodies.

Having described the general details of the instant invention, the following is a specific example of a composition produced thereunder:

EXAMPLE

Lithium hydroxide monohydrate was pressed into cake at 25,000 p.s.i. and then granulated to an average size of about 0.6 inch in diameter. The resultant granules were rolled to remove sharp edges, and separated from fines. The granules are then rolled in a finely divided composition of 95 weight percent magnesium oxide and 5 weight percent sodium silicate, to form an adherent coating having an average thickness of 0.1 inch, corresponding to about 16.6% of the diameter of the resulting absorbent bodies. The particles were then oven dried at a temperature of 120° C. for 6 hours until the water of hydration is removed. The absorbent bodies were placed in canisters and air containing 3% carbon dioxide passed therethrough. Analysis of the resultant gas stream showed substantially immediate full carbon dioxide reaction during gas flow. Analysis of the granulated product after gas passage showed substantial conversion of the magnesium oxide to magnesium carbonate.

In view of the low solubility of magnesium oxide, the composition of the instant invention exhibited little caustic hazard when water flooded. This was particularly the case with compositions containing minimal lithium hydroxide concentrations in the outer layer.

It is also possible that other known absorbers may be incorporated in the composition of the instant invention particularly where the use is above ground or in other environments where caustic hazards are not important. Similarly, other inert materials may be combined with the composition to vary the bulk density or other physical properties thereof.

While particular details of the invention have been disclosed it will be understood, of course, that the invention is not limited thereto, since many modifications may be made and it is, therefore, contemplated by the appended claims to cover any such modification that falls within the true spirit and scope of the invention.

What is claimed and desired to be secured by Letters Patent is:

1. A composite body adapted to absorb carbon dioxide comprising a core consisting essentially of lithium hydroxide and an outer coating of an amount of alkaline earth oxide sufficient to provide decreased caustic hazard in the presence of water which would dissolve said lithium hydroxide.

2. The composite body of claim 1 wherein said alkaline earth oxide is magnesium oxide.

3. The composite body of claim 1 wherein said outer layer also contains up to about 40 weight percent additional lithium hydroxide.

4. The composite body of claim 1 wherein said outer layer also contains up to about 10 weight percent sodium silicate.

5. The composite body of claim 1 wherein said core constitutes from about 75 to 95 percent of the diameter of said body and said outer layer constitutes about 25 to 10 percent of the diameter.

6. The composite body of claim 1 wherein said body is substantially spherical in shape.

7. The composite body of claim 6 wherein said body is about 0.1 to 1.0 inch in diameter.

References Cited

UNITED STATES PATENTS

| | | | |
|---|---|---|---|
| 3,557,011 | 1/1971 | Colombo | 252—189 |
| 2,395,842 | 3/1946 | Borgstrom | 252—190 |
| 1,421,271 | 6/1922 | McNeil | 252—192 X |
| 1,821,195 | 9/1931 | Woodhouse | 252—189 X |
| 3,489,693 | 1/1970 | Bovard | 252—475 |

DANIEL E. WYMAN, Primary Examiner

P. M. FRENCH, Assistant Examiner

U.S. Cl. X.R.

252—475